(12) United States Patent
Carson

(10) Patent No.: US 7,037,072 B2
(45) Date of Patent: May 2, 2006

(54) ROTOR HEAD FOR A ROTARY-WING AIRCRAFT

(76) Inventor: Franklin D. Carson, 933 Street Rd., New Hope, PA (US) 18938

( * ) Notice: Subject to any disclaimer, the term of this patent is extended or adjusted under 35 U.S.C. 154(b) by 140 days.

(21) Appl. No.: 10/792,189

(22) Filed: Mar. 3, 2004

(65) Prior Publication Data
US 2005/0196275 A1 Sep. 8, 2005

(51) Int. Cl.
*B64C 27/52* (2006.01)

(52) U.S. Cl. .......................... 416/1; 416/102; 416/148

(58) Field of Classification Search ................ 416/148, 416/133, 134 A, 102, 1; 244/17.25
See application file for complete search history.

(56) References Cited

U.S. PATENT DOCUMENTS

| | | | | |
|---|---|---|---|---|
| 2,140,295 A | 12/1938 | Mallard | ......................... | 64/7 |
| 2,606,621 A | 8/1952 | Neale | ..................... | 170/135.74 |
| 2,633,925 A | 4/1953 | Bates | ..................... | 170/160.26 |
| 2,648,387 A | 8/1953 | Doman | ................... | 170/135.75 |
| 2,653,456 A | 9/1953 | Heym | ........................... | 64/7 |
| 2,806,662 A * | 9/1957 | Yonkers | ..................... | 416/102 |
| 2,861,640 A * | 11/1958 | Du Pont | ..................... | 416/102 |
| 2,861,641 A | 11/1958 | Bensen | ................... | 170/160.27 |
| 3,007,654 A | 11/1961 | Doman | ................... | 244/17.11 |
| 3,288,226 A | 11/1966 | Lemont | ................... | 170/160.26 |
| 3,412,680 A | 11/1968 | Girard | ....................... | 102/35.4 |
| 3,804,552 A | 4/1974 | Covington | ................... | 416/134 |
| 4,054,039 A | 10/1977 | Takahashi et al. | ............... | 64/21 |
| 4,073,600 A | 2/1978 | Doman | ....................... | 416/140 |
| 4,111,605 A | 9/1978 | Roman et al. | ............... | 416/141 |
| 4,115,031 A | 9/1978 | Drees et al. | ................. | 416/134 |
| 4,323,332 A | 4/1982 | Fradenburgh | ................ | 416/134 |
| 4,326,834 A | 4/1982 | Ostrowski | ..................... | 416/134 |
| 4,358,283 A | 11/1982 | Kumpar | ..................... | 464/143 |
| 4,459,122 A | 7/1984 | Rehfeld | ..................... | 464/143 |
| 4,477,225 A | 10/1984 | Burkam | ..................... | 416/134 |
| 4,569,629 A | 2/1986 | Ferris et al. | ................. | 416/134 |
| 4,575,358 A | 3/1986 | Ferris | ............................ | 464/90 |
| 4,580,945 A | 4/1986 | Miller | ......................... | 416/134 |
| 4,676,669 A | 6/1987 | Byrnes et al. | ................ | 384/221 |
| 4,695,227 A | 9/1987 | Head et al. | ................. | 416/134 |
| 5,201,107 A | 4/1993 | Mazziotti | ........................ | 29/434 |
| 5,230,659 A | 7/1993 | Bird et al. | ................... | 464/143 |
| 6,616,537 B1 | 9/2003 | Thomas et al. | .............. | 464/145 |

OTHER PUBLICATIONS

Constant Velocity (CV) Joints, http://www.infodotinc.com/basae/118.htm, Dec. 13, 2003, 3 pages.
Fradenburgh, E.A. et al., The Sikorsky Dynaflex Rotor—An Advances Main Rotor System for the 1990's, *Presented at the 40th Annual Forum of the American Helicopter Society*, May 16-18, 1984, 1-16.

* cited by examiner

*Primary Examiner*—Edward K. Look
*Assistant Examiner*—Richard A Edgar
(74) *Attorney, Agent, or Firm*—Woodcock Washburn LLP

(57) ABSTRACT

A preferred embodiment of a rotor head for a rotary-wing aircraft having a plurality of rotor blades and a drive shaft includes a gimbal mechanically coupled to the drive shaft so that the gimbal rotates with the drive shaft, and a hub pivotally coupled to the gimbal for receiving the rotor blades. The rotor head also includes an actuator mechanically coupled to the hub for causing the hub to pivot about the gimbal.

34 Claims, 7 Drawing Sheets

ROTOR HEAD FOR A ROTARY-WING AIRCRAFT

FIELD OF THE INVENTION

The present invention relates to rotary-wing aircraft such as helicopters. More particularly, the invention relates to a rotor head for a rotary-wing aircraft that permits the relative orientation between the rotor blades and the fuselage of the rotary-wing aircraft to be varied.

BACKGROUND OF THE INVENTION

Rotary-wing aircraft such as helicopters typically comprise a fuselage, a tail boom fixedly coupled to and extending from the fuselage, a pylon fixedly coupled to an end of the tail boom, an engine and transmission mounted on the fuselage, and a rotor system coupled to the engine and transmission by a rotatable mast (drive shaft).

The rotor head comprises a centrally-located hub to which the rotor blades are mechanically coupled. The rotor blades generate lift that suspends the fuselage below the rotor blades during flight. The overall lift is typically controlled by a collective control that collectively varies the pitch of the rotor blades. Directional control of the helicopter is usually achieved, in part, by a cyclic control that varies the pitch of each rotor blade on a cyclic basis so as to asymmetrically vary the overall lift.

The plane of rotation of the rotor blades, in general, must be tilted forward for the helicopter to fly in the forward direction. Helicopters are often constructed so that the plane of rotation of the rotor blades is angled in relation to the longitudinal axis of the fuselage (this angle is commonly referred to as "mast tilt").

Mast tilt, under certain conditions, can allow the fuselage to remain level, or nearly level, in relation to the direction of flight. Operating a helicopter in this manner is desirable because the aerodynamic drag exerted on the fuselage is believed to be at or near its minimum when the fuselage is level in relation to the direction of flight. Achieving a desired airspeed under other operating conditions, i.e., at other airspeeds, weights, weight distributions, etc., may necessitate tilting the plane of rotation of the rotor blades to an extent that causes the fuselage to be angled to a substantial degree in relation to the direction of flight. Operating a helicopter with a substantial angle between the fuselage and the direction of flight can lead to excessive drag and a reduction in the maximum airspeed achievable at a given operating condition.

Rotor heads that allow the plane of rotation of the rotor blades to vary in relation to the drive shaft (and the fuselage) have been developed. These types of rotor heads, however, are typically "free-floating" systems. In other words, the relative orientation of the rotor blades and the fuselage is determined, to a large extent, by the aerodynamic forces acting on the rotor blades. Hence, these types of systems do not facilitate positive control of the angle between the rotor blades and the fuselage so as to permit the angle to be optimized to achieve minimum drag and maximum airspeed for the helicopter.

The concept of a rotor head that incorporates a universal-joint-type mechanism to pivotally couple the rotor blades to the mast has been developed. The use of a universal-joint-type mechanism in such an application can subject a helicopter to excessive vibration, however, as universal joints typically generate harmonic vibrations when used to transmit torque between two non-aligned shafts.

Flexible materials, such as elastomeric materials, have been used in rotor heads to facilitate varying the angle between the plane of rotation of the rotor blades and the fuselage. Flexible materials are generally unsuited for the high stresses that may be generated in such load-bearing applications, however. Hence, the use of such materials in this manner can adversely affect the durability, reliability, and safety of the rotor head.

SUMMARY OF THE INVENTION

A preferred embodiment of a rotor head for a rotary-wing aircraft having a plurality of rotor blades and a drive shaft comprises a gimbal mechanically coupled to the drive shaft so that the gimbal rotates with the drive shaft, and a hub pivotally coupled to the gimbal for receiving the rotor blades. The rotor head also comprises an actuator mechanically coupled to the hub for causing the hub to pivot about the gimbal.

Another preferred embodiment of a rotor head for a rotary-wing aircraft having a plurality of rotor blades and a drive shaft comprises a gimbal secured to the drive shaft, a hub pivotally coupled to gimbal and comprising a plurality of sleeves for receiving the rotor blades, and a swash plate assembly having a first portion secured to the hub. The rotor head also comprises a screw jack mechanically coupled to a second portion of the swash plate assembly so that extension and retraction of the screw jack causes an orientation of the swash plate assembly and the hub to change in relation to the drive shaft.

A preferred embodiment of a rotor assembly for a rotary-wing aircraft comprises a plurality of rotor blades, a drive shaft, and a constant-velocity joint mechanically coupling the rotor blades to the drive shaft. The constant velocity joint is restrained from pivoting in relation to the drive shaft by an actuator and a swash plate assembly.

Another preferred embodiment of a rotor head for a rotary-wing aircraft having a plurality of rotor blades and a drive shaft comprises a gimbal secured to the drive shaft, and a hub comprising a plurality of sleeves for receiving the rotor blades. The hub is mechanically coupled to the gimbal and an actuator and the hub pivots about the gimbal on a selective basis in response to movement of the actuator.

A preferred method for controlling an angle between a plane of rotation of rotor blades of a rotary-wing aircraft and a drive shaft that transmits torque to the rotor blades comprises providing a constant-velocity joint for mechanically coupling the rotor blades and the drive shaft, and causing the rotor blades to pivot in relation to the drive shaft by way of the universal joint using an actuator.

A preferred method is provided for operating a rotary-wing aircraft having a fuselage, and plurality of rotor blades mechanically coupled to a hub of a rotor head, wherein the rotor blades and the hub rotate in relation to the fuselage. The preferred method comprises altering an angle between a plane of rotation of the rotor blades and the fuselage, and locking a plane of rotation of the rotor blades in a particular orientation in relation to the fuselage.

BRIEF DESCRIPTION OF THE DRAWINGS

The foregoing summary, as well as the following detailed description of a presently-preferred embodiment, is better understood when read in conjunction with the appended diagrammatic drawings. For the purpose of illustrating the invention, the drawings show an embodiment that is presently preferred. The invention is not limited, however, to the specific instrumentalities disclosed in the drawings. In the drawings.

DESCRIPTION OF PREFERRED EMBODIMENTS

Figure 1:
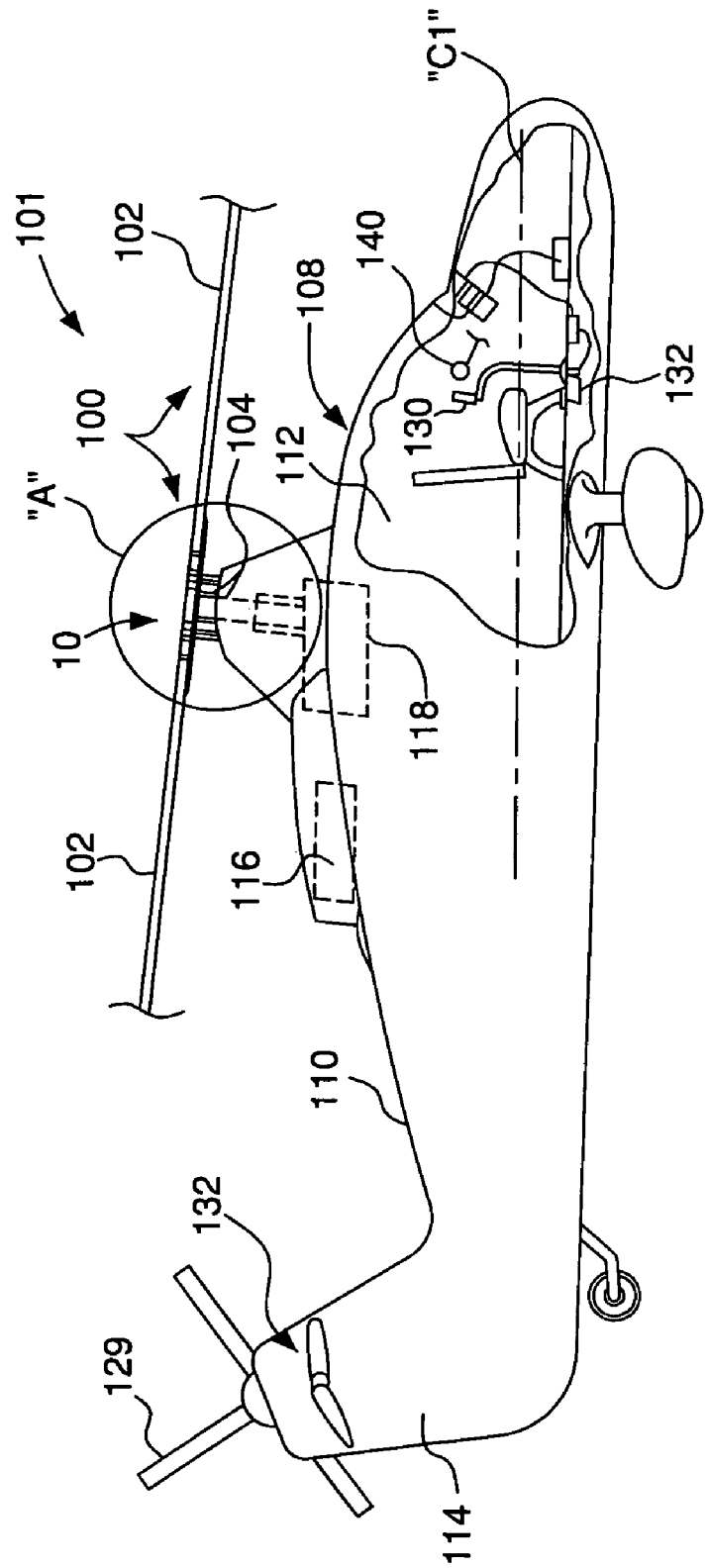
FIG. 1 is a side view of a helicopter comprising a preferred embodiment of a rotor head.

A preferred embodiment of a rotor head 10 is depicted in FIGS. 1–6. The rotor head 10 can be used as part of the rotor system 100 of a helicopter 101. Specific details relating to the helicopter 101 (other than details of the rotor head 10) are presented for exemplary purposes only, as the rotor head 10 can be used in conjunction with virtually any type of rotary-wing aircraft.

The rotor head 10 comprises a hub 12, a gimbal (pivot) 14, and a plurality of ball bearings 16. The hub 12 comprises a body 17 having a plurality of sleeves 23 formed therein (see FIG. 6).

The rotor system 100 further comprises a plurality of rotor blades 102. An end of each rotor blade 102 is secured within a corresponding one of the sleeves 23 in a conventional manner so that the rotor blade 102 can pivot about its longitudinal axis in relation to the hub 12. The hub 12 and the rotor blades 102 rotate in a counterclockwise direction (when viewed from above), about an axis passing substantially through the center of the hub 12. (The helicopter 101 comprises three of the rotor blades 102. This particular configuration is presented for exemplary purposes only, as the rotor head 10 can be adapted for use with helicopters having more or less than three rotor blades.)

The rotor system 100 also comprises a drive shaft (mast) 104 for transmitting torque to the rotor system 100. The drive shaft 104 preferably has a tilt of approximately seven degrees. In other words, the centerline of the drive shaft 104 is preferably oriented at an angle of approximately eighty-three degrees in relation to the longitudinal centerline of the helicopter 101 (the longitudinal centerline of the helicopter 101 is denoted in the figures by the reference symbol "C1"). (The optimal value for the tilt of the drive shaft 104 is application independent. A specific value for this parameter is specified for exemplary purposes only.)

Figure 2:
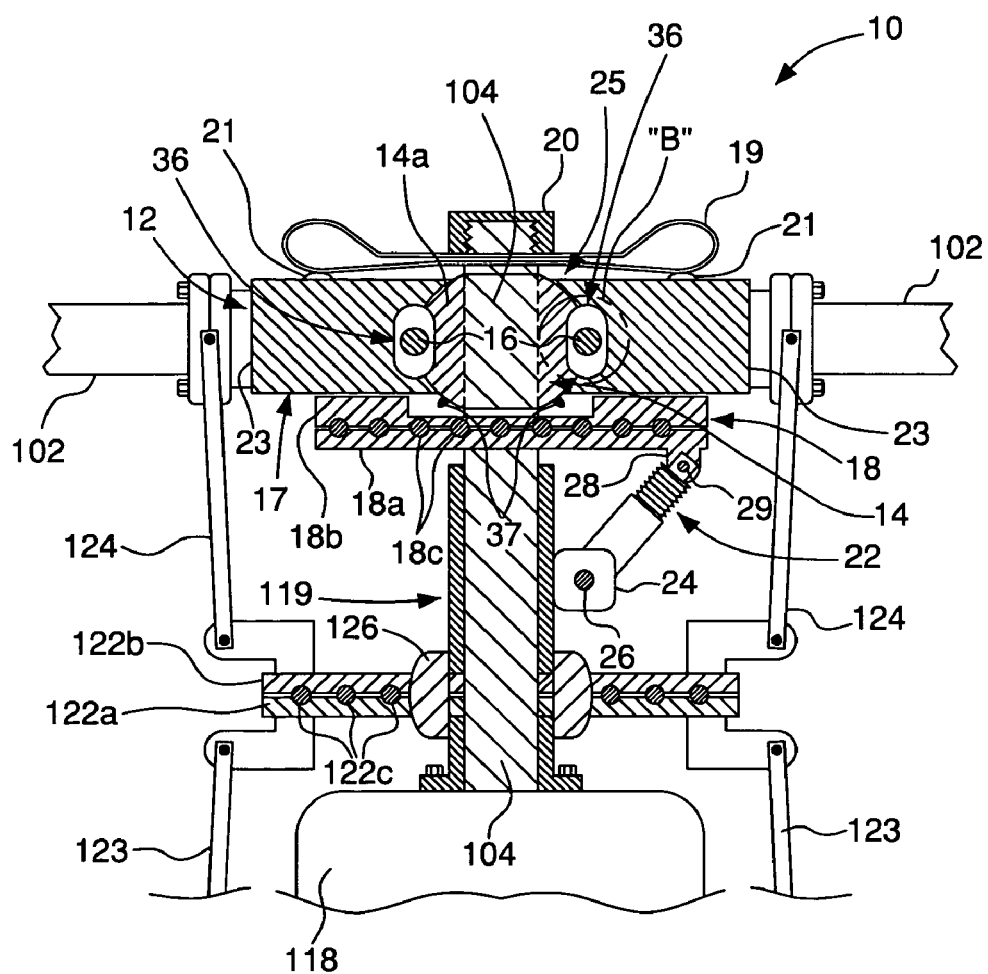
FIG. 2 is a magnified cross-sectional view of the area designated "A" in FIG. 1, depicting the rotor head in a level orientation.

The gimbal 14 is fixedly coupled to the drive shaft 104 so that the gimbal 14 rotates with the drive shaft 104 (see FIG. 2). The interface between the gimbal 14 and the drive shaft 104 can be configured as a spline (or other suitable configuration) to facilitate the transmission of torque from the drive shaft 104 to the gimbal 14. The gimbal 14 can be secured to the drive shaft 104 by any suitable means such as threads, clamps, etc.

The hub 12 is pivotally coupled to the gimbal 14 by way of the ball bearings 16. Moreover, the torque transmitted through the drive shaft 104 is transmitted to the hub 12 (and the rotor blades 102) by way of the ball bearings 16. The hub 12, gimbal 14, and ball bearings 16 comprise a constant velocity joint 25 that permits the plane of rotation of the rotor blades 112 to be varied in relation to the drive shaft 104, as explained in detail below.

Figure 3:
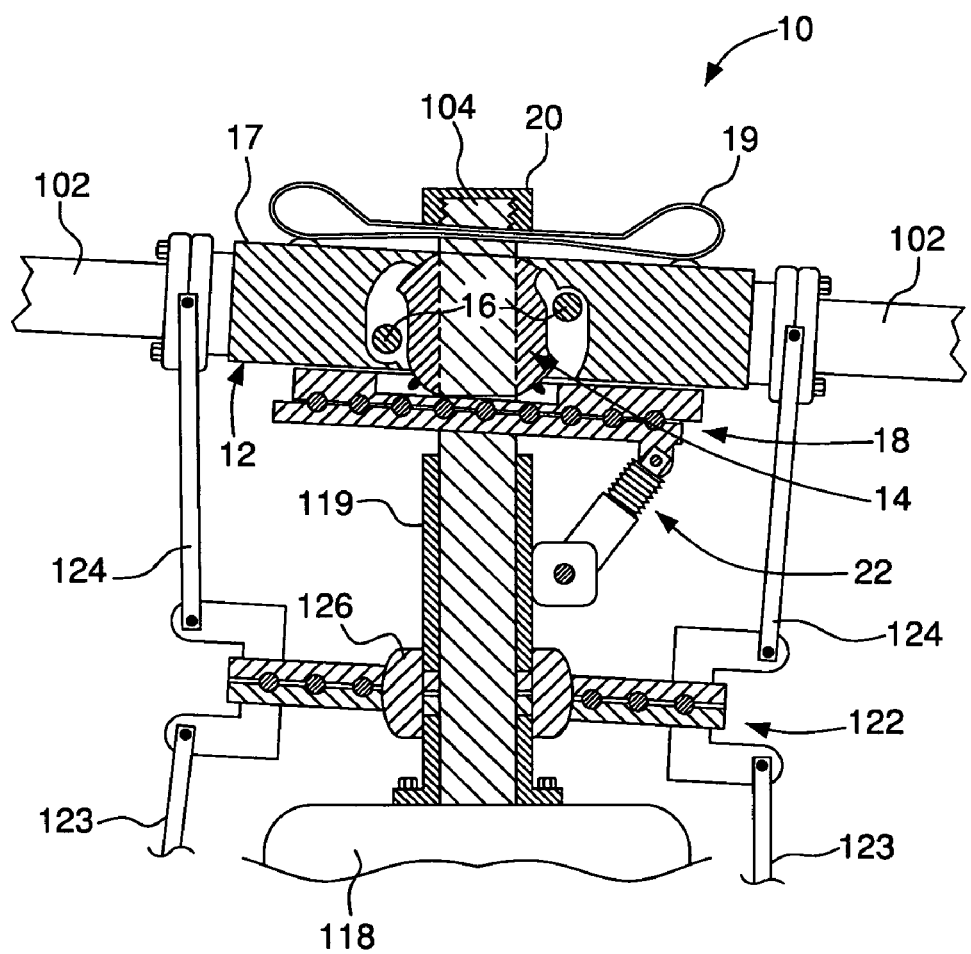
FIG. 3 is a cross-sectional side view of the rotor head shown in FIGS. 1 and 2, depicting the rotor head in an orientation tilted in the forward direction.
Figure 4:
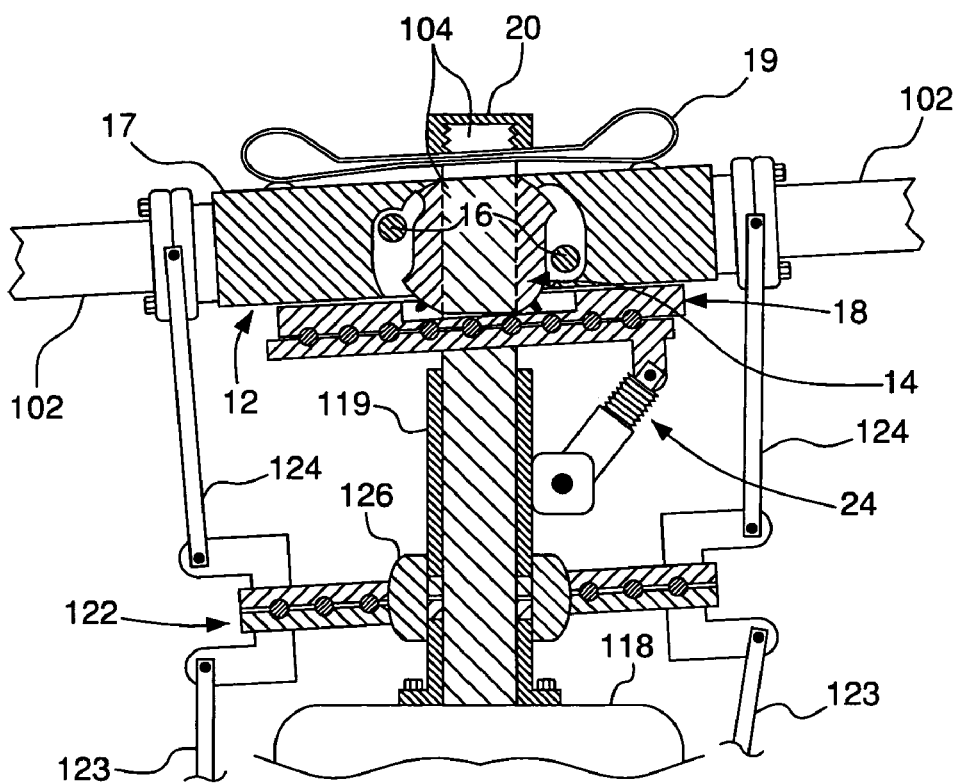
FIG. 4 is a cross-sectional side view of the rotor head shown in FIGS. 1–3, depicting the rotor head in an orientation tilted in the rearward direction.

The hub 12 is biased toward its level position by a spring 19 (see FIGS. 2–4). (The "level" position of the hub 12 corresponds to a position in which the plane of rotation of the hub 12 is approximately perpendicular to the drive shaft 104, as shown in FIG. 2.) The spring 19 is positioned above the hub 12, and acts against an elastomeric bumper 21 that extends circumferentially along an upper surface of the body 17 of the hub 12. The spring 19 is secured in position by a hub nut 20 coupled to an upper end of the drive shaft 104 by a suitable means such as threads.

The helicopter 100 also comprises a fuselage 108 and a tail boom (empennage) 110. The tail boom 110 is fixedly coupled to, and extends rearward from the fuselage 108 (from the perspective of FIG. 1). The fuselage 108 includes a cabin 112 that accommodates a pilot, passengers, and cargo. The helicopter 100 further comprises a pylon 114 fixedly coupled to a rearward end of the tail boom 110.

The helicopter 101 also comprises a first and a second engine 116, and a transmission (gearbox) 118. The first and second engine 116 and the transmission 118 are mounted on the fuselage 108. The drive shaft 104 is coupled to the transmission 118 so that torque generated by the engines 116 imparts rotation to the drive shaft 104. The drive shaft 104 extends through a collar 119 mounted on the transmission 118. Rotation of the drive shaft 104 rotates the hub 12 and the rotor blades 102. The rotor blades 102 generate lift that suspends the fuselage 108 below the rotor blades 102 and the rotor head 10 during flight.

The lift generated by each rotor blade 102 is related to the orientation of the rotor blade 102 in relation to its direction of travel. More particularly, increasing the pitch of each rotor blade 102 in relation to its direction of travel increases the angle of attack of the rotor blade 102, and thereby increases the lift generated by the rotor blade 102.

The main rotor assembly 100 further comprises a first swash plate assembly 122, a plurality of rotating control tubes 124, and a plurality of non-rotating control tubes 123 (see FIG. 2). The first swash plate assembly 122 comprises a non-rotating swash plate 122a and a rotating swash plate 122b each positioned around the drive shaft 104. The first swash plate assembly 122 also comprises a plurality of bearings 122c positioned between the rotating swash plate 122b and the non-rotating swash plate 122b.

The first swash plate assembly 122 is coupled to the collar 119 by a conventional gimbal (pivot) 126. The gimbal 126 permits the first swash plate assembly 122 to pivot in relation to the collar 119 and the drive shaft 104.

The rotating control tubes 124 are coupled to the rotating swash plate 122b so that vertical movement of all or a portion of the rotating swash plate 122b induces a corresponding vertical movement in one or more of the rotating control tubes 124. Each rotating control tube 124 is also coupled to a respective one of the rotor blades 102 so that vertical movement of the rotating control tube 124 causes the corresponding rotor blade 102 to pivot in relation to the hub 12, thereby altering the angle of attack of the rotor blade 102.

It should be noted that directional terms such as "vertical," "upward," "downward," etc. are used in reference to the component orientations depicted in FIGS. 1 and 2. These terms are used for illustrative purposes only, and are not intended to limit the scope of the appended claims.

The non-rotating control tubes 123 are coupled to the non-rotating swash plate 122b so that vertical movement of one or more of the non-rotating control tubes 123 induces a corresponding vertical movement in all or a portion of the non-rotating swash plate 122b.

The helicopter 101 further comprises a conventional cyclic control that, in conjunction with a conventional tail rotor 129, provides directional control for the helicopter 100. The cyclic control comprises a control stick 130 mounted in the cabin 112 proximate the pilot's position, and a mechanical linkage 132 coupled to the control stick 130 and the non-rotating control tubes 123 (see FIG. 1). Movement of the control stick 130 from its neutral (centered) position in response to pilot input imparts movement to the linkage 132. This movement is transmitted to the non-rotating control tubes 123 via the linkage 132, and causes the non-rotating control tubes 123 to move upward or downward in a non-uniform manner in relation to the hub 12.

The non-uniform vertical movement of the non-rotating control tubes 123 causes the non-rotating swash plate 122b to tilt in relation to the fuselage 108 and the hub 12. The non-rotating swash plate 122b imparts a corresponding tilt to the rotating swash plate 122b by way of the bearings 122c.

The tilt of the rotating swash plate 122b causes the rotating control tubes 124 to move upward and downward on a cyclical basis as the rotating swash plate 122b and the rotating control tubes 124 rotate in relation to the non-rotating swash plate 122a. The cyclical movement of each rotating control tube 124 in the vertical direction causes the rotor blade 102 coupled thereto to deflect in relation to the hub 12 on a cyclical basis. In other words, the upward and downward movement of the rotating control tubes causes the angle of attack of each rotor blade 102 to vary throughout each revolution of the rotor blade 102 around the drive shaft 104. This cyclical variation causes the main rotor assembly 100 to generate asymmetric lift. The asymmetric lift causes the helicopter 101 to pitch or roll, and thereby provides directional control for the helicopter 101.

The tail rotor 129 is rotatably coupled to the pylon 114 (see FIG. 1). The tail rotor 129 is driven by the transmission 118 via a first shaft extending between the transmission 118 and an intermediate gearbox (not pictured) located within the tail boom 110, and a second shaft extending between the intermediate gearbox and the tail rotor 129. The tail rotor 129 generates a torque about the yaw axis of the helicopter 101. This torque counteracts the torque of main rotor assembly 100, and provides directional control for the helicopter 101. The helicopter 101 also comprises a horizontal stabilizer 132 for stabilizing and trimming the helicopter 100 about its pitch axis. (The horizontal stabilizer 132 is depicted as having a movable portion for exemplary purposes only. The rotor head 10 can be used in conjunction with rotary-wing aircraft having a stabilizer that is fixed in its entirely.)

Further details of the rotor head 10 are as follows. The gimbal 14 has a plurality of grooves 30 formed in an outer circumferential surface 14a thereof (see FIG. 5). The grooves 30 extend substantially in the vertical direction (from the perspective of FIGS. 1, 2, and 5).

Figure 6:
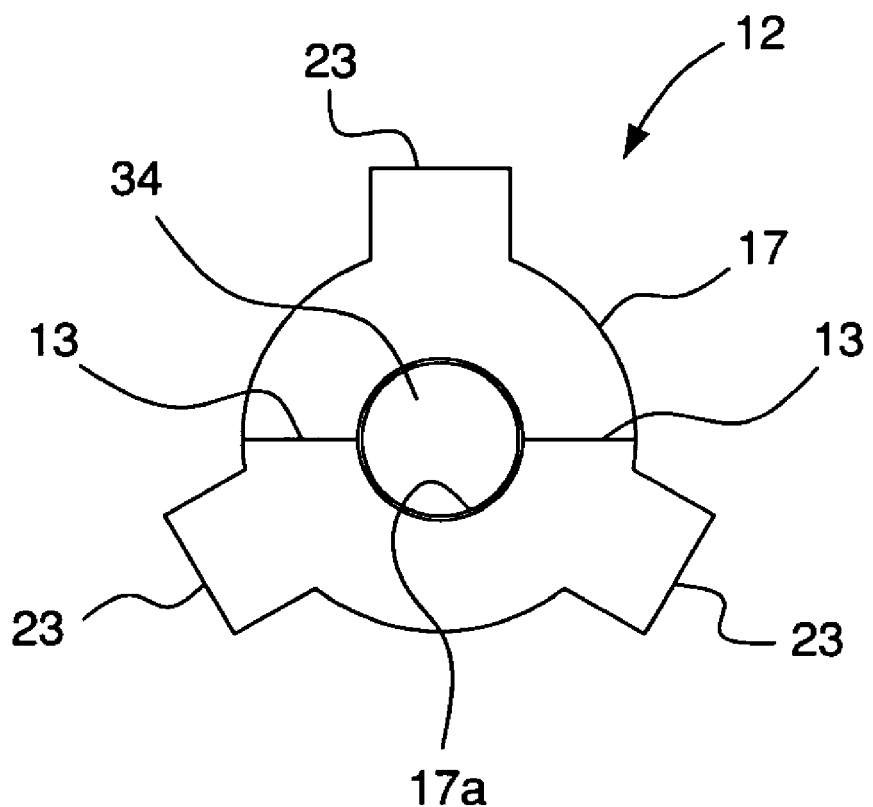
FIG. 6 is a top view of a hub of the rotor head shown in FIGS. 1–5.

The body 17 of the hub 12 has an inner circumferential surface 17a (see FIG. 6). The surface 17a has a contour that substantially matches the contour of the outer circumferential surface 14a of the gimbal 14. The surface 17a defines a central opening 34 in the hub 12. The central opening 34 receives the gimbal 14. (The body 17 of the hub 12 can be formed as two pieces (or more) joined along a split line 13, as shown in FIG. 6, to facilitate installation of the hub 12 over the gimbal 14.)

The gimbal 14 is sized so that minimal clearance exists between the surface 14a of the gimbal 14 and the surface 17a of the body 17. (The optimal clearance between the surfaces 14a, 17a, is application-dependent. A specific value for this parameter therefore is not specified herein.) The interface between the surfaces 14a, 17a can be filled with grease or another suitable lubricant to reduce friction between the surfaces 14a, 17a.

Figure 5:
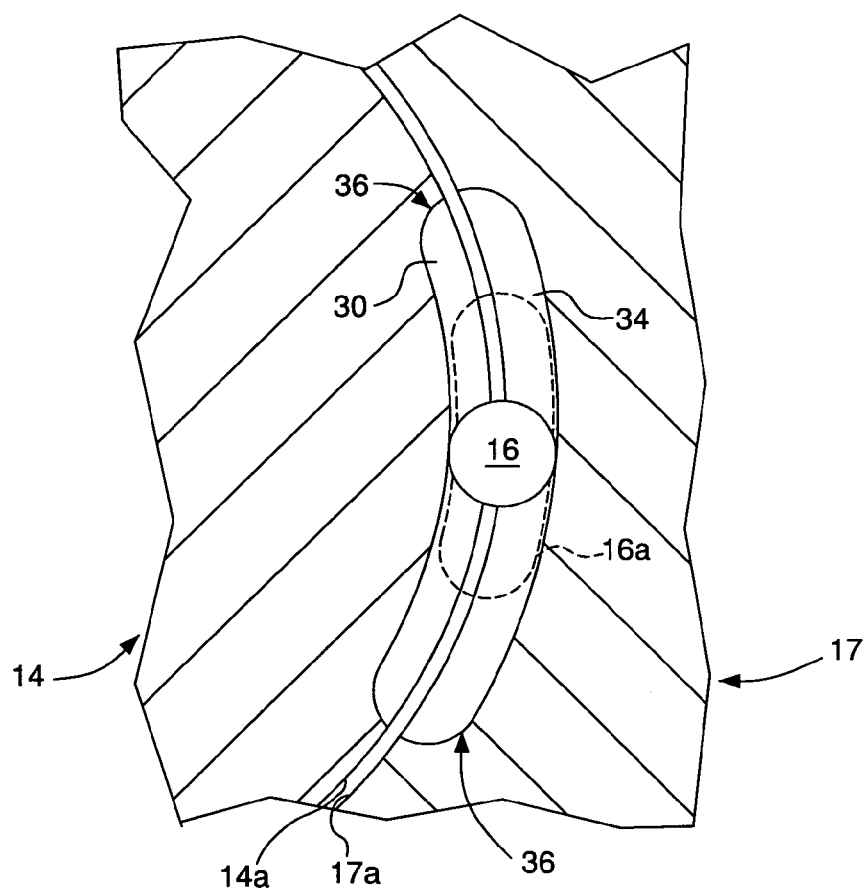
FIG. 5 is a magnified view of the area designated "B" in FIG. 2.

The inner circumferential surface 17a of the body 17 has a plurality of grooves 34 formed therein (see FIG. 5). (Alternatively, the body 17 can be equipped with an insert having the grooves 34 formed therein.) The grooves 34 are positioned so that each groove 34 faces a corresponding one of the grooves 30 in the gimbal 14. Each associated groove 30 and groove 34 define a race 36. Each race 36 receives a corresponding one of the ball bearings 16.

The head 12 pivots on the ball bearings 16 in relation to the gimbal 14, as discussed above. The length of the grooves 30, 34 is preferably selected so that the hub 12 can pivot approximately three degrees to either side of its level position. (The optimal value for the degree of travel of the hub 12 is application independent. A specific value for this parameter is specified for exemplary purposes only.) The rotor head 10 can be equipped with stops 37 (see FIG. 2) to limit the pivoting motion the hub 12 (thereby preventing possible damage to the ball bearings 16 caused by the ball bearings 16 being forced against the ends of the grooves 30, 34).

The ball bearings 16 also transmit torque from the gimbal 14 to the head 12. In particular, the torque imparted to the gimbal 14 from the drive shaft 104 is imparted to the ball bearings 16 by way of the contacting surface of each associated groove 30. The torque imparted to the ball bearings 16, in turn, is imparted to the hub 12 by way of the contacting surface of each associated groove 36.

It should be noted that the above-noted pivoting motion and torque transmission between the gimbal 14 and the hub 12 can be facilitated by suitable means other than the ball bearings 16. For example, a elongated bearing 16a that provides a greater surface area for torque transmission can be used in the alternative to the ball bearings 16 (the bearing 16a is depicted in phantom in FIG. 5).

The rotor head 10 further comprises a second swash plate assembly 18 and an actuator 22 (see FIG. 2–4). The actuator 22 and the second swash plate assembly 18 cooperate to tilt the hub 12 in relation to the drive shaft 104. The second swash plate assembly 18 comprises a non-rotating swash plate 18a and a rotating swash plate 18b. The rotating swash plate 18b is rotatably coupled to the non-rotating swash plate 18a by a plurality of ball bearings 18c, i.e., the rotating swash plate 18b can rotate in relation to the non-rotating swash plate 18a by virtue of the ball bearings 18c, in a conventional manner. (The non-rotating swash plate 18a and the rotating swash plate 18b are configured in a conventional manner with flanges (not shown) that prevent the non-rotating swash plate 18a and the rotating swash plate 18b from separating.)

The rotating swash plate 18b is fixedly coupled to a lower surface of the body 17 of the hub 12 by a suitable means such as conventional fasteners (not shown). (The non-rotating swash plate 18a is thus suspended from the rotating swash plate 18b and the hub 12.)

A first end of the actuator 22 is pivotally coupled to the collar 119 by a flange 24 and a pin 26. A second end of the actuator 22 is pivotally coupled to a flange 28 formed on the non-rotating swash plate 18a, by way of a pin 29. The actuator 22 is preferably coupled to a forward-facing portion of the collar 119, and the flange 28 is preferably located on a forward portion of the non-rotating swash plate 18a. This arrangement causes the actuator 22 to extend forward and upward (but not laterally) from the collar 119 (from the perspective of FIGS. 1 and 2). (The actuator 22 can be coupled to a rearward-facing portion of the collar 119, and the flange 28 can be located on a rearward portion of the non-rotating swash plate 18a in alternative embodiments.)

The actuator 22 is preferably an electrically-actuated screw jack, although other types of suitable actuators can be used in the alternative. The actuator 22 extends or contracts in length between an extend position (FIG. 4) and a retracted position (FIG. 3). The actuator 22 is activated in response to a control input. Extension of the actuator 22 exerts an upward force on the flange 28 of the non-rotating swash plate 18a. Contraction of the actuator 22 exerts a downward force on the flange 18a of the non-rotating swash plate 50.

The upward force on the flange 28 urges the non-rotating swash plate 18a upward. The upward force is transmitted to the rotating swash plate 18b by way of the ball bearings 18c. The rotating swash plate 18b is fixedly coupled the hub 12, as discussed above. The upward force transmitted to the rotating swash plate 18b is thus transmitted to the hub 12.

The upward force on the second swash plate assembly 18 and the hub 12 causes the hub 12 to pivot about the gimbal 14. In particular, the ball bearings 16 travel upward or downward in their respective races 36 in response to the upward force on the hub 16 (see FIG. 4). The movement of the ball bearings 16 in the races 36 facilitates the pivoting motion of the hub 16 about the gimbal 14.

The actuator 22 extends forward and upward (but not laterally) from the collar 119, as noted above. This arrangement causes the hub 12 and the attached rotor blades 102 to tilt in the rearward direction as the actuator 22 extends, as depicted in FIG. 4. In other words, the pivoting motion of the hub 12 about the gimbal 14 causes the forward end of the hub 12 to translate upward, and the rearward end of the hub 12 to translate downward. The hub 12 and the rotor blades 102 thus tilt substantially about an axis extending perpendicular to the centerline C1 of the helicopter 101. The hub 12 and the rotor blades 102 do not tilt substantially about the centerline of the helicopter 101.

Moreover, the actuator 22 restrains (locks) the hub 12 in a particular orientation (angular position) in relation to the drive shaft 104. In particular, the length of the actuator 22 will remain substantially constant until the actuator 22 is once again activated. The actuator 22 will therefore restrain or lock the hub 12 (and the plane of rotation of the rotor blades 102) in a particular orientation in relation to the drive shaft 104 (and the fuselage 108) until the actuator 22 is again activated.

Conversely, contraction of the actuator 22 causes the hub 12 to pivot about the gimbal 14 so that the forward end of the hub 12 translates downward, and the rearward end of the hub 12 translates upward, as depicted in FIG. 3. In other words, contraction of the actuator 22 causes the hub 12 and the rotor blades 102 to tilt in the forward direction. The actuator 22 will restrain, or lock the hub 12 (and the plane of rotation of the rotor blades 102) in a particular orientation in relation to the drive shaft 104 until the actuator 22 is once again activated, as discussed above.

Torque from the drive shaft 104 is transmitted to the hub 12 and the attached rotor blades 102 by way of the gimbal 14 and the ball bearings 16 in the manner discussed above, regardless of the tilt angle of the hub 12.

Moreover, the hub 12, gimbal 14, and ball bearings 16 are believed to function as a constant velocity joint. In other words, the angular velocity of the hub 12 and the blades 102 remain substantially constant as the hub 12 and rotor blades 102 rotate at a given tilt angle. The hub 12, pivot 14, and ball bearings 16 are believed to have the effect of a lag hinge that allows the tip speeds of the rotor blades 102 to remain substantially constant as the rotor blades 102 rotate at a given tilt angle, regardless of whether flapping or coning is present in the rotor blades 102.

The above-described configuration of the hub 12, gimbal 14, and ball bearings 16, it is believed, does not induce oscillatory motion in the rotor blades 102. In particular, the behavior of the hub 12, gimbal 14, and ball bearings 16 as a constant-velocity joint is believed to eliminate the potential for the rotor blades 102 to be subject to harmonic vibrations, as can occur where a universal joint is used to transmit torque between two non-aligned shafts. The hub 12, gimbal 14, and ball bearings 16 can thus facilitate rotation of the rotor blades 102 at a higher velocity, and with less vibration than would be possible if the rotor blades 102 were coupled to the drive shaft 104 via a universal joint or similar mechanism.

The actuator 22 extends or contracts between its extended and retracted positions in response to a control input, as discussed above. The control input is preferably an electrical signal generated using a suitable device such as a thumbwheel switch 140 responsive to the input of the pilot. (Alternatively, the control input can be generated automatically using, for example, a flight data computer of the helicopter 101.)

For example, the pilot of the helicopter 101 can generate a command that causes the actuator 22 to tilt the hub 12 forward, i.e., toward the position shown in FIG. 3, when a high airspeed is desired. (The actuator 22, upon deactivation, also locks the hub 12 in a particular orientation, as discussed above.)

The tilt of the drive shaft 104 in relation to the centerline C1 of the helicopter 101 is approximately seven degrees, as noted above. The ability to tilt the hub 12 forward by approximately three degrees from its level position, i.e., from the position depicted in FIG. 2, thus permits the plane of rotation of the rotor blades 102 to be angled (tilted) by approximately ten degrees in relation to the longitudinal centerline C1 of the helicopter 101.

Tilting the plane of rotation of the rotor blades 102 by ten degrees allows the rotor blades 102 to generate a relatively large amount of forward thrust, without the necessity of tilting the fuselage 108 of the helicopter 101 at a large angle in relation to the direction of flight. In other words, the additional tilt of the rotor blades 102 achievable by pivoting the hub 12 in relation to the drive shaft 104 can help to minimize the angle between the centerline C1 of the helicopter 101, and the direction of flight. Minimizing this angle, it is believed, can help to maximize the airspeed and minimize the fuel consumption of the helicopter 101.

Moreover, the behavior of the hub 12, gimbal 14, and ball bearings 16 as a constant velocity joint, it is believed, can help to minimize the vibrations which the rotor blades 102 experience when the hub 12 is tilted in relation to the drive shaft 104. The use of the rotor head 10 can thus allow the rotor blades 102 to be operated at a higher rotational velocity than may otherwise be possible, potentially increasing the maximum airspeed of the helicopter 101. The rotor head 10 can thus facilitate positive control of the angle between the fuselage 108 and the plane of rotation of the rotor blades 102. The rotor head 10 thus permits the angle between the fuselage 108 and the plane of rotation of the rotor blades 102 to be optimized for different operating conditions of the helicopter 10.

The pilot of the helicopter 101 can generate a command that causes the actuator 22 to tilt the hub 12 rearward, i.e., toward the position shown in FIG. 4, when it is desired to hover or land the helicopter 101. (The actuator 22, upon deactivation, also locks the hub 12 in a particular orientation, as discussed above.) In particular, the plane of rotation of the rotor blades 102 can be tilted rearward by approximately three degrees in relation to the centerline C1 of the helicopter 101. The angle between the plane of rotation and the centerline C1 can thus be reduced to approximately four degrees. Reducing the noted angle to this value can make it easier to control the helicopter 101 in hover, particularly where the center of gravity of the helicopter 101 is at or near its aft limit, while permitting a relatively large mast tilt (seven degrees) conducive to high-speed flight.

The foregoing description is provided for the purpose of explanation and is not to be construed as limiting the invention. While the invention has been described with reference to preferred embodiments or preferred methods, it is understood that the words which have been used herein are words of description and illustration, rather than words of limitation. Furthermore, although the invention has been described herein with reference to particular structure, methods, and embodiments, the invention is not intended to be limited to the particulars disclosed herein, as the invention extends to all structures, methods and uses that are within the scope of the appended claims. Those skilled in the relevant art, having the benefit of the teachings of this specification, may effect numerous modifications to the invention as described herein, and changes may be made without departing from the scope and spirit of the invention as defined by the appended claims.

Figure 7:
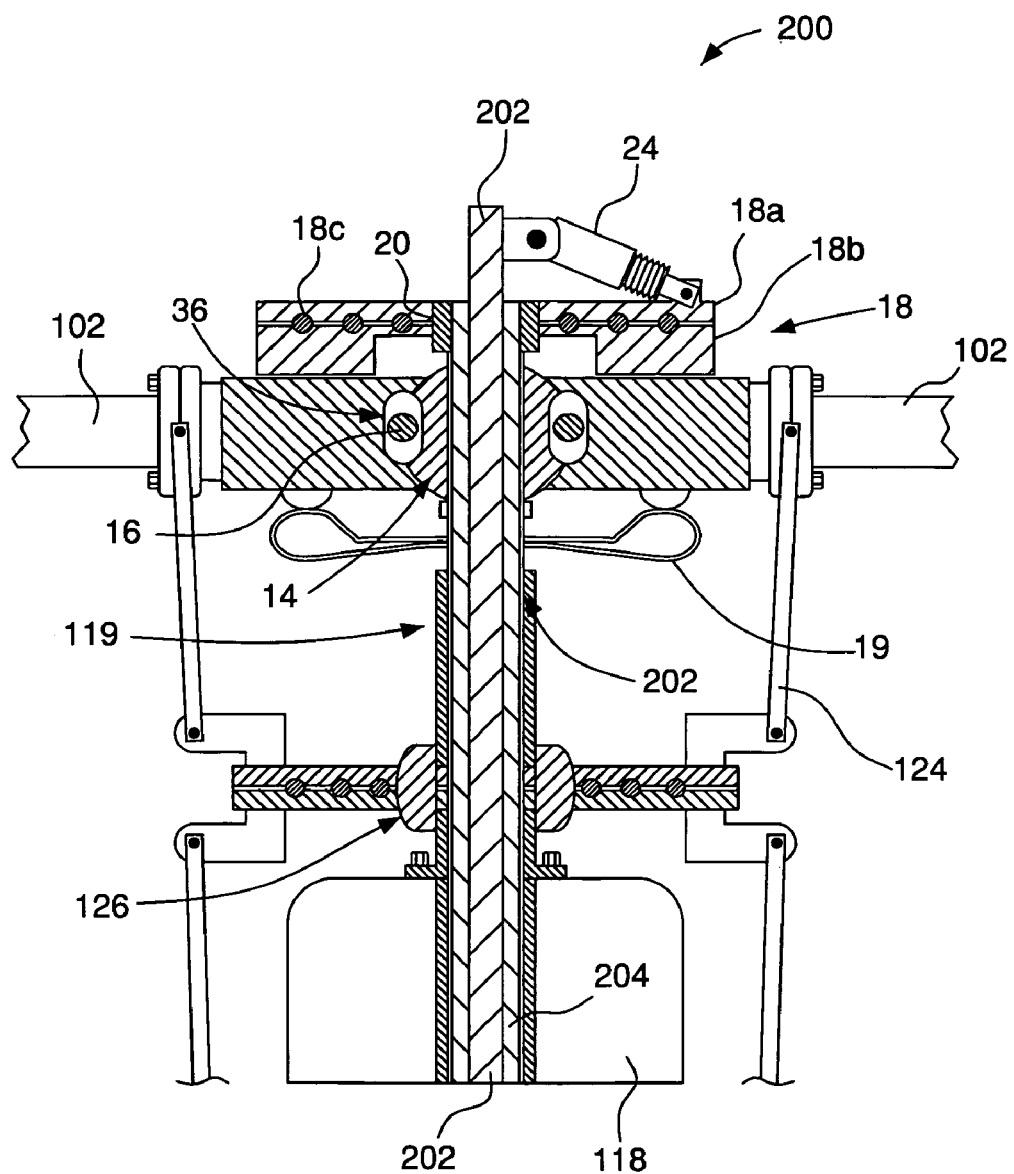
FIG. 7 is a cross-sectional side view of an alternative embodiment of the rotor head shown in FIGS. 1–6.

For example, FIG. 7 depicts an alternative embodiment of the rotor head 10 in the form of a rotor head 200. Components of the rotor head 200 that are substantially identical to those of the rotor head 10 are denoted by identical reference numerals in the figures.

The actuator 24 and the first swash plate assembly 18 of the rotor head 200 are located on top of the hub 12. Moreover, the actuator 24 is pivotally coupled to a stationary shaft 202 that extends through a drive shaft 204. (The drive shaft 204 rotates in relation to the stationary shaft 202 by way of bearings positioned therebetween (the bearings are not shown in FIG. 7, for clarity).)

What is claimed is:

1. A rotor head for a rotary-wing aircraft having a plurality of rotor blades and a drive shaft, the rotor head comprising:
    a gimbal mechanically coupled to the drive shaft so that the gimbal rotates with the drive shaft;
    a hub pivotally coupled to the gimbal for receiving the rotor blades;
    an actuator mechanically coupled to the hub for causing the hub to pivot about the gimbal; and
    a swash plate assembly comprising a rotating swash plate fixedly coupled to the hub, and a non-rotating swash plate rotatably coupled to the rotating swash plate and pivotally coupled to the actuator so that the actuator exerts a force on the swash plate assembly that causes the hub to pivot about the gimbal.

2. The rotor head of claim 1, wherein the swash plate assembly further comprises a plurality of ball bearings and the rotating swash plate rotates in relation to the non-rotating swash plate by way of the bearings.

3. The rotor head of claim 1, wherein the actuator is a screw jack.

4. The rotor head of claim 1, wherein the actuator is a screw jack, the drive shaft extends through a collar, a first end of the actuator is pivotally coupled to the collar, and a second end of the actuator is pivotally coupled the swash plate assembly so that expansion of the actuator causes the hub to pivot about the gimbal in a first direction and retraction of the actuator causes the hub to pivot about the gimbal in a second direction.

5. The rotor head of claim 1, wherein the swash plate assembly is fixedly coupled to a first side of the hub, and the rotor head further comprises a spring that contacts a second side of the hub and urges the hub toward the swash plate assembly.

6. The rotor head of claim 1, wherein the actuator can lock the hub in a particular orientation in relation to the drive shaft.

7. A rotor head for a rotary-wing aircraft having a plurality of rotor blades and a drive shaft, the rotor head comprising:
   a gimbal secured to the drive shaft;
   a hub pivotally coupled to gimbal and comprising a plurality of sleeves for receiving the rotor blades;
   a swash plate assembly having a first portion secured to the hub; and
   a screw jack mechanically coupled to a second portion of the swash plate assembly so that extension and retraction of the screw jack causes an orientation of the swash plate assembly and the hub to change in relation to the drive shaft.

8. The rotor head of claim 7, wherein the first portion of the swash plate assembly is rotatably coupled to the second portion of the swash plate assembly by a plurality of ball bearings.

9. The rotor head of claim 7, wherein the drive shaft rotates within a collar, a first end of the screw jack is pivotally coupled to the collar, and a second end of the drive shaft is pivotally coupled to the second portion of the swash plate assembly.

10. The rotor head of claim 7, wherein the hub is pivotally coupled to the gimbal by a plurality of ball bearings.

11. The rotor head of claim 10, wherein the hub has a plurality of grooves formed in an inner circumferential surface thereof, the gimbal has a plurality of grooves formed in an outer surface thereof, each of the grooves formed in the inner circumferential surface of the hub faces a corresponding one of the grooves formed in the gimbal to form a race for receiving one of the ball bearings.

12. The rotor head of claim 7, further comprising a second swash plate for varying a pitch of the rotor blades.

13. The rotor head of claim 7, wherein the first portion of the swash plate assembly is secured to a first side of the hub, and the rotor head further comprises a spring that contacts a second side of the hub and urges the hub toward the swash plate assembly.

14. The rotor head of claim 7, wherein the screw jack locks the angular position of the swash plate assembly and the hub in relation to the drive shaft when the screw jack is deactivated.

15. A rotor assembly for a rotary-wing aircraft, comprising:
   a plurality of rotor blades;
   a drive shaft; and
   a constant-velocity joint mechanically coupling the rotor blades to the drive shaft, the constant velocity joint comprising a gimbal coupled to the drive shaft so that the gimbal rotates with the drive shaft; a hub having a plurality of sleeves for receiving the rotor blades, and a plurality of ball bearings for pivotally coupling the hub to the gimbal, wherein the constant velocity joint is restrained from pivoting in relation to the drive shaft by an actuator and a swash plate assembly.

16. A rotor head for a rotary-wing aircraft having a plurality of rotor blades and a drive shaft, the rotor head comprising a gimbal secured to the drive shaft, a hub comprising a plurality of sleeves for receiving the rotor blades, an actuator, a swash plate assembly mechanically coupled to the actuator and fixedly coupled to a first side of the hub so that the actuator exerts a force on the swash plate assembly that causes the hub to pivot about the gimbal, and a spring that contacts a second side of the hub and urges the hub toward the swash plate assembly, wherein the hub is mechanically coupled to the gimbal and the actuator and the hub pivots about the gimbal on a selective basis in response to movement of the actuator.

17. The rotor head of claim 16, wherein the swash plate assembly comprises a rotating swash plate fixedly coupled to the hub, and a non-rotating swash plate rotatably coupled to the rotating swash plate and pivotally coupled to the actuator.

18. The rotor head of claim 16, further comprising a plurality of ball bearings, wherein the hub pivots in relation to the gimbal by way of the ball bearings.

19. The rotor head of claim 18, wherein the hub has a plurality of grooves formed in an inner circumferential surface thereof, the gimbal has a plurality of grooves formed in an outer surface thereof, each of the grooves formed in the inner circumferential surface of the hub faces a corresponding one of the grooves formed in the gimbal to form a race for receiving one of the ball bearings.

20. The rotor head of claim 16, wherein the actuator is a screw jack, the drive shaft extends through a collar, a first end of the actuator is pivotally coupled to the collar, and a second end of the actuator is pivotally coupled the swash plate assembly so that expansion of the actuator causes the hub to pivot about the gimbal in a first direction and retraction of the actuator causes the hub to pivot about the gimbal in a second direction.

21. The rotor head of claim 16, where the actuator can lock the hub in a particular angular position in relation to the drive shaft on a selective basis.

22. A method for controlling an angle between a plane of rotation of rotor blades of a rotary-wing aircraft and a drive shaft that transmits torque to the rotor blades, comprising:
   providing a constant-velocity joint for mechanically coupling the rotor blades and the drive shaft; and
   causing the rotor blades to pivot in relation to the drive shaft by way of the universal joint using a jack screw.

23. The method of claim 22, further comprising locking a hub on which the rotor blades are mounted and the plane of rotation of the rotor blades in a particular orientation in relation to the drive shaft using the jack screw.

24. A method for operating a rotary-wing aircraft having a fuselage, a plurality of rotor blades mechanically coupled to a hub of a rotor head, and a drive shaft pivotally coupled to the hub, wherein the rotor blades and the hub are rotated in relation to the fuselage by the drive shaft, the method comprising altering an angle between a plane of rotation of the rotor blades and the drive shaft, altering a pitch of the rotor blades independently of altering the angle between the plane of rotation of the rotor blades and the fuselage, and locking a plane of rotation of the rotor blades in a particular orientation in relation to the drive shaft.

25. The method of claim 24, wherein altering an angle between a plane of rotation of the rotor blades and the drive shaft comprises altering the angle between the plane of rotation of the rotor blades and the drive shaft to achieve a desired airspeed for the rotary-wing aircraft.

26. The method of claim 24, wherein locking the plane of rotation of the rotor blades in a particular orientation in relation to the drive shaft comprises locking the plane of rotation of the rotor blades in a particular orientation using an actuator mechanically coupled to the hub and a non-rotating component of the rotary-wing aircraft.

27. A rotor head for a rotary-wing aircraft having a plurality of rotor blades and a drive shaft, the rotor head comprising:
- a gimbal mechanically coupled to the drive shaft so that the gimbal rotates with the drive shaft;
- a hub pivotally coupled to the gimbal for receiving the rotor blades;
- an actuator mechanically coupled to the hub for causing the hub to pivot about the gimbal; and
- a plurality of bearings, wherein the hub pivots in relation to the gimbal by way of the bearings.

28. The rotor head of claim 27, wherein the bearings are ball bearings.

29. The rotor head of claim 27, wherein the bearings are elongated bearings.

30. The rotor head of claim 27, wherein the hub has a plurality of grooves formed in an inner circumferential surface thereof, the gimbal has a plurality of grooves formed in an outer surface thereof, each of the grooves formed in the inner circumferential surface of the hub faces a corresponding one of the grooves formed in the gimbal to form a race for receiving one of the ball bearings.

31. A rotor head for a rotary-wing aircraft having a plurality of rotor blades and a drive shaft, the rotor head comprising:
- a gimbal mechanically coupled to the drive shaft so that the gimbal rotates with the drive shaft;
- a hub pivotally coupled to the gimbal for receiving the rotor blades;
- an actuator mechanically coupled to the hub for causing the hub to pivot about the gimbal;
- a first swash plate assembly mechanically coupled to the actuator and the hub so that the actuator exerts a force on the swash plate assembly that causes the hub to pivot about the gimbal; and
- a second swash plate assembly for varying a pitch of the rotor blades.

32. A rotor head for a rotary-wing aircraft having a plurality of rotor blades and a drive shaft, the rotor head comprising:
- a gimbal mechanically coupled to the drive shaft so that the gimbal rotates with the drive shaft;
- a hub pivotally coupled to the gimbal for receiving the rotor blades, the hub having an inner circumferential surface defining a central opening that receives the gimbal; and
- an actuator mechanically coupled to the hub for causing the hub to pivot about the gimbal.

33. The rotor head of claim 32, wherein the inner circumferential surface of the hub has a contour that substantially matches a contour of an outer circumferential surface of the hub.

34. A method for operating a rotary-wing aircraft having a fuselage, a rotor head, and plurality of rotor blades mechanically coupled to a hub of the rotor head, wherein the rotor blades and the hub rotate in relation to the fuselage, the method comprising controlling an angle between a plane of rotation of the rotor blades and the fuselage using a first swash plate assembly and an actuator mechanically coupled to the first swash plate assembly and the hub, and controlling the pitch of the rotor blades in relation to the hub using a second swash plate assembly mechanically coupled to the rotor blades.

* * * * *